United States Patent
Okano et al.

(10) Patent No.: US 12,429,167 B2
(45) Date of Patent: Sep. 30, 2025

(54) HIGH PRESSURE GAS CONTAINER AND PRODUCTION METHOD THEREFOR

(71) Applicant: JFE STEEL CORPORATION, Tokyo (JP)

(72) Inventors: Hiroshi Okano, Tokyo (JP); Kazuki Matsubara, Tokyo (JP); Shusaku Takagi, Tokyo (JP); Nobuyuki Ishikawa, Tokyo (JP); Toshio Takano, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 370 days.

(21) Appl. No.: 18/250,536

(22) PCT Filed: Nov. 2, 2021

(86) PCT No.: PCT/JP2021/040464
§ 371 (c)(1),
(2) Date: Apr. 26, 2023

(87) PCT Pub. No.: WO2022/102478
PCT Pub. Date: May 19, 2022

(65) Prior Publication Data
US 2024/0003491 A1    Jan. 4, 2024

(30) Foreign Application Priority Data
Nov. 10, 2020 (JP) .................................. 2020-187525

(51) Int. Cl.
*F17C 1/14* (2006.01)
*F16J 12/00* (2006.01)
(Continued)

(52) U.S. Cl.
CPC ................. *F17C 1/14* (2013.01); *F16J 12/00* (2013.01); *F17C 2201/0104* (2013.01);
(Continued)

(58) Field of Classification Search
CPC ...... F17C 1/14; F17C 1/02; F17C 1/00; F17C 13/06; F17C 2201/0104; F17C 2201/0138;
(Continued)

(56) References Cited

U.S. PATENT DOCUMENTS 10,941,905 B2 *  3/2021  Wada ....................... F16J 12/00
11,543,079 B2 *  1/2023  Wada ....................... F17C 1/14
(Continued)

FOREIGN PATENT DOCUMENTS

JP    2002030344 A  *  1/2002
JP    2004052857 A  *  2/2004
(Continued)

OTHER PUBLICATIONS

Jan. 11, 2022, International Search Report issued in the International Patent Application No. PCT/JP2021/040464.
(Continued)

*Primary Examiner* — Bayan Salone
(74) *Attorney, Agent, or Firm* — KENJA IP LAW PC

(57) ABSTRACT

To alleviate stress exerted on a thread portion of a high pressure gas container including a metallic container to prevent fatigue fracture, there is provided a high pressure gas container comprising a metallic container, wherein the metallic container includes: a metallic cylinder; a female thread portion on an inner peripheral surface of the metallic cylinder at at least one end; and a lid having, on an outer peripheral surface, a male thread portion configured to screw into the female thread portion, and a maximum value of residual compressive stress at a position of 0.4 mm in a depth direction from a plurality of thread bottoms of the female thread portion and the male thread portion is 100 MPa or more, less than or equal to tensile strength of a material of the metallic cylinder, and less than or equal to tensile strength of a material of the lid.

6 Claims, 4 Drawing Sheets

(51) Int. Cl.
  *F17C 1/00*     (2006.01)
  *F17C 1/02*     (2006.01)
  *F17C 13/06*    (2006.01)

(52) U.S. Cl.
  CPC ............... *F17C 2203/0619* (2013.01); *F17C 2203/0636* (2013.01); *F17C 2203/0673* (2013.01); *F17C 2205/0311* (2013.01); *F17C 2209/22* (2013.01); *F17C 2223/035* (2013.01)

(58) Field of Classification Search
  CPC ........ F17C 2201/056; F17C 2201/0119; F17C 2203/0636; F17C 2203/0673; F17C 2203/0619; F17C 2203/0604; F17C 2203/0607; F17C 2203/0617; F17C 2203/0643; F17C 2203/0648; F17C 2203/0663; F17C 2203/0675; F17C 2203/0695; F17C 2209/234; F17C 2209/22; F17C 2221/012; F17C 2223/0123; F17C 2223/036; F17C 2260/011; F17C 2270/0178; F17C 2270/0184; F17C 2270/0139; F17C 2205/0311; F16J 12/00; Y02E 60/32
  See application file for complete search history.

(56) References Cited

U.S. PATENT DOCUMENTS

| | | | |
|---|---|---|---|
| 2019/0049069 A1 | 2/2019 | Wada et al. | |
| 2020/0340625 A1 | 10/2020 | Wada et al. | |
| 2021/0278043 A1* | 9/2021 | Arashima | ................ F17C 1/00 |
| 2021/0348724 A1* | 11/2021 | Wada | ..................... F17C 13/04 |

FOREIGN PATENT DOCUMENTS

| | | | | | |
|---|---|---|---|---|---|
| JP | 2015158243 A | * | 9/2015 | | |
| JP | 2016089891 A | * | 5/2016 | | |
| JP | 2017101284 A | * | 6/2017 | ............. | C22C 38/00 |
| JP | 2017141919 A | * | 8/2017 | ............. | F17C 13/06 |
| JP | 2018009683 A | * | 1/2018 | ............. | C22C 38/12 |
| JP | 2019044967 A | * | 3/2019 | | |
| JP | 2019082188 A | * | 5/2019 | ............... | F17C 1/14 |
| JP | 2019113121 A | * | 7/2019 | | |
| JP | 2019218584 A | * | 12/2019 | | |
| JP | 2020063778 A | * | 4/2020 | ............. | F17C 13/06 |
| KR | 1020190128767 A | | 11/2019 | | |
| WO | WO-2018012633 A1 | * | 1/2018 | ............. | C22C 38/46 |

OTHER PUBLICATIONS

Aug. 13, 2024, Notification of Reasons for Refusal issued by the Japan Patent Office in the corresponding Japanese Patent Application No. 2021-179843 with English language concise statement of relevance.

Apr. 11, 2023, Notification of Reasons for Refusal issued by the Japan Patent Office in the corresponding Japanese Patent Application No. 2021-179843 with English language concise statement of relevance.

Oct. 31, 2024, Office Action issued by the Korean Intellectual Property Office in the corresponding Korean Patent Application No. 10-2023-7015585 with English language concise statement of relevance.

Mar. 11, 2025, Notification of Reasons for Refusal issued by the Japan Patent Office in the corresponding Japanese Patent Application No. 2021-179843 with English language concise statement of relevance.

Apr. 10, 2024, the Extended European Search Report issued by the European Patent Office in the corresponding European Patent Application No. 21891724.3.

* cited by examiner

HIGH PRESSURE GAS CONTAINER AND PRODUCTION METHOD THEREFOR

TECHNICAL FIELD

The present disclosure relates to a high pressure gas container and a production method therefor.

BACKGROUND

Fuel cell vehicles, which can solve not only the $CO_2$ emission issue but also the energy issue, are expected as new vehicles in the future. Hydrogen stations for supplying hydrogen to fuel cell vehicles are equipped with high pressure gas containers (also referred to as pressure vessels) that store hydrogen at a pressure of 80 MPa or more.

There are mainly two types of shapes of such high pressure gas containers: One is a cylinder-type container with a dome part formed by drawing an end of a pipe or tube, such as a gas cylinder. The other is a straight-type container with lids on both ends of a straight pipe or tube.

The cylinder-type container has a shape in which the cross-sectional area inside the container decreases toward a gas outlet, i.e. a longitudinal end. The end is referred to as "dome part". A mouthpiece for taking gas in and out is provided at the tip of the dome part, and is sealed with a tightener having a screw. Since the area of the tightener is sufficiently small as compared with the cross-sectional area of the cylindrical part of the cylinder-type container, the stress exerted on the thread portion of the mouthpiece is reduced and therefore there is no problem with pressure sealing. However, high pressure gas containers for hydrogen stations and the like require periodic inner surface inspection after start of use, and it is difficult to perform inner surface inspection on the cylinder-type container.

In the case of producing a high pressure gas container using a metallic container, the metallic container is usually subjected to heat treatment for the purpose of strength improvement. The heat treatment typically involves quenching, i.e. a process of heating the metallic container and then rapidly cooling it using a coolant. In the case of the cylinder-type container, however, charging and discharging the coolant into and from the container takes time, so that the cooling rate in the heat treatment decreases and the steel microstructure varies greatly.

Moreover, while scale and a decarburized layer form on the surface of the metallic container due to the heat treatment, in the case of the cylinder-type container, it is difficult to remove such scale and decarburized layer formed on the container inner surface. Accordingly, the inner surface of the metallic container is used as heat treated, which causes degradation in the fatigue resistance of the metallic container.

These problems may be avoided by using the straight-type container. In a structure in which a straight pipe or tube is lidded, the opening of the pipe or tube is large, so that cooling in the heat treatment is easy and the microstructure of the steel material can be precisely controlled. In addition, a decarburized layer and scale which form during the heat treatment can be easily removed by machining. Moreover, the inner surface of the container can be easily inspected after use by removing the lid. Furthermore, since the straight-type container does not have a dome part formed by deep drawing, there is little variation caused by processing, and uniform container production is possible. Examples of such high pressure gas containers include those described in JP 2015-158243 A (PTL 1) and JP 2017-141919 A (PTL 2).

CITATION LIST

Patent Literature

PTL 1: JP 2015-158243 A
PTL 2: JP 2017-141919 A

SUMMARY

Technical Problem

In the case of using the straight-type container, all internal pressure is received by the lid because the cross section of the container is constant. The lid structure of the high pressure gas container using the straight-type container is thus required to withstand very high pressure.

Examples of the lid structure of the straight-type container include a structure in which a flange is provided at an end of the straight-type container and the lid is bolted using the flange, and a structure in which the lid is screwed to the container.

However, the lid structure using the flange has the problem in that the provision of the flange causes an increase in container size and an increase in cost. To meet the demand for reduction in container size and cost, it is desirable to use the screw-type lid structure.

With the screw-type lid structure, the problem in the case of using the flange can be avoided. However, high stress applied to the thread portion can cause fatigue fracture originating from the thread portion.

It could therefore be helpful to alleviate stress exerted on a thread portion of a high pressure gas container including a metallic container to prevent fatigue fracture.

Solution to Problem

Upon examination, we discovered the following.

(1) When a metallic container of a high pressure gas container is filled with gas, internal pressure is exerted on the metallic container, and causes tensile stress on the metallic container. The tensile stress is concentrated in the thread portion, especially near the thread bottom.

(2) By applying specific residual compressive stress beforehand to the vicinity of the thread bottom, at least part of the tensile stress exerted on the thread portion when the metallic container is filled with gas is offset by the residual compressive stress, so that the stress actually exerted on the thread portion can be alleviated significantly. Fatigue fracture originating from the thread portion can thus be suppressed.

(3) When internal pressure higher than the normal pressure of the high pressure gas container is applied to the high pressure gas container, excessive stress is generated and local plastic deformation occurs in the thread bottom. Since plastic deformation occurs only in one part and most of the other regions are elastic regions, compressive stress remains in the thread bottom after the internal pressure is removed. Hence, by applying high internal pressure to the high pressure gas container under certain conditions in the high pressure gas container production process, the predetermined residual compressive stress can be applied to the thread portion.

The present disclosure is based on these discoveries. We thus provide the following.

1. A high pressure gas container comprising a metallic container, wherein the metallic container includes: a metallic cylinder having a female thread portion on an inner peripheral surface of at least one end; and a lid having, on an outer peripheral surface, a male thread portion configured to screw into the female thread portion, and a maximum value of residual compressive stress at a position of 0.4 mm in a depth direction from a plurality of thread bottoms of the female thread portion and the male thread portion is 100 MPa or more, less than or equal to tensile strength of a material of the metallic cylinder, and less than or equal to tensile strength of a material of the lid.

2. The high pressure gas container according to 1., wherein the maximum value of residual compressive stress is less than or equal to yield stress of the material of the metallic cylinder, and less than or equal to yield stress of the material of the lid.

3. The high pressure gas container according to 1. or 2., wherein the male thread portion of the lid is screwed into the female thread portion of the metallic cylinder, and the maximum value of residual compressive stress at a position of 0.4 mm in the depth direction from the plurality of thread bottoms of the female thread portion and the male thread portion is more than 0.

4. A production method for a high pressure gas container including a metallic container that includes: a metallic cylinder having a female thread portion on an inner peripheral surface of at least one end; and a lid having, on an outer peripheral surface, a male thread portion configured to screw into the female thread portion, the production method comprising applying an internal pressure to the metallic container under at least one of the following conditions (A) and (B) and under both of the following conditions (C) and (D):
   (A) thread bottom stress of the female thread portion is more than yield stress of a material of the metallic cylinder;
   (B) thread bottom stress of the male thread portion is more than yield stress of a material of the lid;
   (C) axial stress of the metallic cylinder is less than or equal to tensile strength of the material of the metallic cylinder; and
   (D) circumferential stress of the metallic cylinder is less than or equal to the tensile strength of the material of the metallic cylinder.

5. A production method for a high pressure gas container including a metallic container that includes: a metallic cylinder having a female thread portion on an inner peripheral surface of at least one end; and a lid having, on an outer peripheral surface, a male thread portion configured to screw into the female thread portion, the production method comprising: attaching a jig having a male thread portion on an outer peripheral surface to the metallic cylinder so that the male thread portion of the jig is screwed into the female thread portion of the metallic cylinder; applying an internal pressure to the metallic container under the following conditions (A), (C), and (D):
   (A) thread bottom stress of the female thread portion is more than yield stress of a material of the metallic cylinder;
   (C) axial stress of the metallic cylinder is less than or equal to tensile strength of the material of the metallic cylinder; and
   (D) circumferential stress of the metallic cylinder is less than or equal to the tensile strength of the material of the metallic cylinder;
   removing the jig from the metallic container; and tightening the lid on the metallic cylinder so that the male thread portion of the lid is screwed into the female thread portion of the metallic cylinder, wherein in the tightening of the lid, tightening torque is adjusted so that a maximum value of residual compressive stress at a position of 0.4 mm in a depth direction from a plurality of thread bottoms of the female thread portion and the male thread portion is more than 0.

Advantageous Effect

It is thus possible to alleviate stress exerted on a thread portion of a high pressure gas container to prevent fatigue fracture. Such a high pressure gas container can be used with higher pressure and larger cross section than conventional high pressure gas containers.

DETAILED DESCRIPTION

The following will describe embodiments of the present disclosure in detail. The following description shows examples of preferred embodiments of the present disclosure and does not limit the scope of the present disclosure.

[High Pressure Gas Container]

A high pressure gas container in one embodiment of the present disclosure is a high pressure gas container comprising a metallic container, wherein the metallic container includes: a metallic cylinder having a female thread portion on an inner peripheral surface of at least one end; and a lid having, on an outer peripheral surface, a male thread portion configured to screw into the female thread portion.

The lid is preferably provided at both ends of the metallic container. In other words, it is preferable that the metallic container includes: a metallic cylinder having a female thread portion on an inner peripheral surface of both ends; and a lid having, on an outer peripheral surface, a male thread portion configured to screw into the female thread portion.

The high pressure gas container can be used as a high pressure hydrogen gas container, such as a hydrogen station container, a mobile hydrogen station, or a vehicle-mounted container. The use of the high pressure gas container is not limited to such, and the high pressure gas container can be used for any purpose.

In the present disclosure, it is important that the maximum value of residual compressive stress at a position of 0.4 mm in the depth direction from the plurality of thread bottoms of the female thread portion and the male thread portion is 100 MPa or more, less than or equal to the tensile strength of the material of the metallic cylinder, and less than or equal to the tensile strength of the material of the lid. The reasons for this will be explained below.

Figure 1:
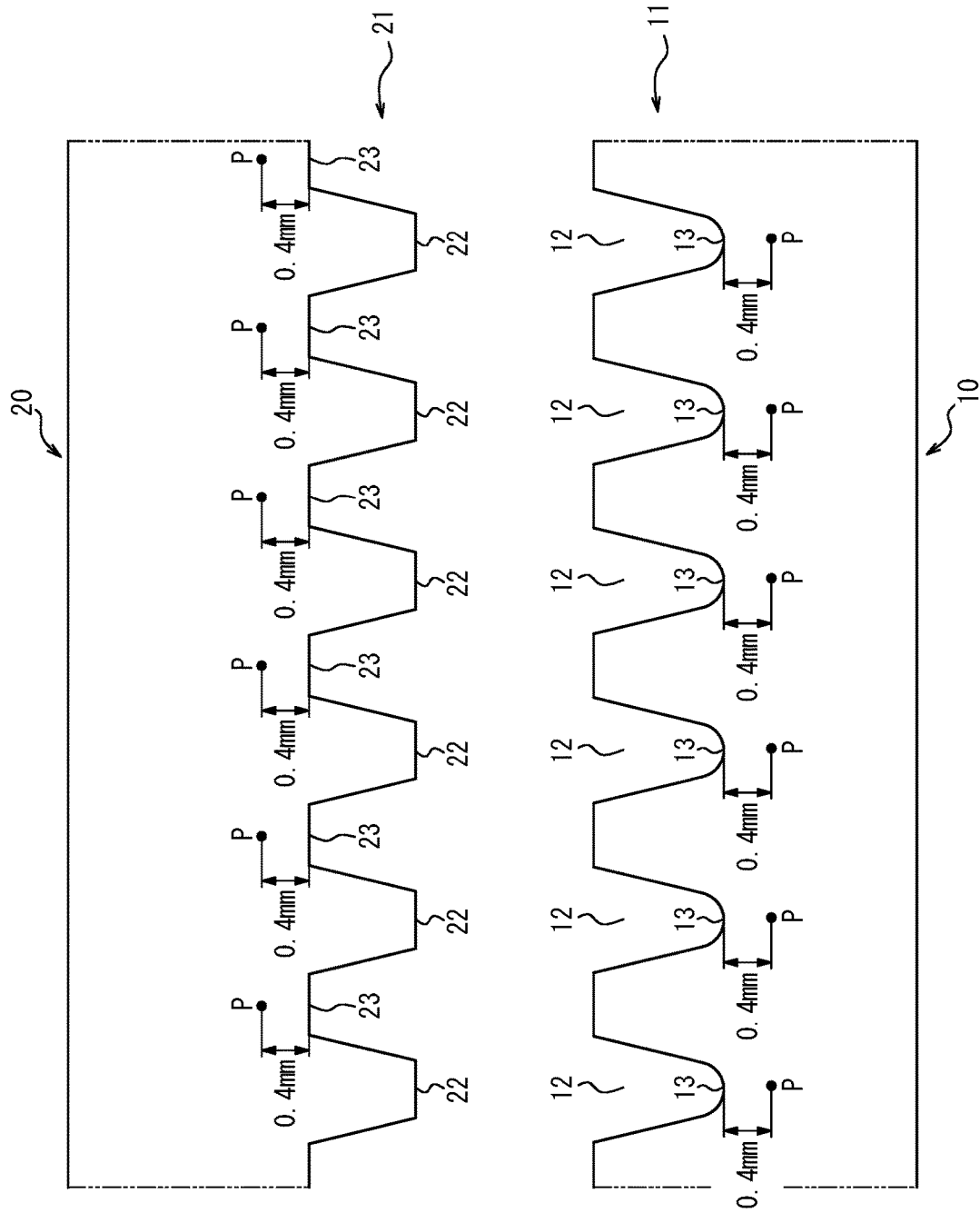
FIG. 1 is a schematic diagram illustrating positions where compressive residual stress is specified in the present disclosure.

FIG. 1 is a schematic diagram illustrating positions where compressive residual stress is specified in the present disclosure. A female thread portion 11 provided on the inner peripheral surface of at least one end of a metallic cylinder 10 has a plurality of thread grooves 12. The bottom of each thread groove 12 is a thread bottom 13 of the female thread portion. A male thread portion 21 configured to screw into the thread grooves 12 of the female thread portion 11 is provided on the outer peripheral surface of the lid 20, and has a plurality of thread ridges 22. Assuming the space between adjacent thread ridges 22 as a thread groove, the bottom of the thread groove is a thread bottom 23 of the male thread portion. In the present disclosure, control is performed so that the maximum value of residual compressive stress at a position P of 0.4 mm in the depth direction from the thread bottoms 13 of the female thread portion and the thread bottoms 23 of the male thread portion will satisfy the foregoing conditions. FIG. 1 is merely a schematic diagram for explanation, and does not represent the actual shapes and dimensions of the thread portions.

As mentioned above, when a metallic container of a high pressure gas container is filled with gas during use, internal pressure is exerted on the metallic container and causes tensile stress. The tensile stress is concentrated in the thread portion, especially near the thread bottom. By applying residual compressive stress beforehand to the vicinity of the thread bottom, at least part of the tensile stress exerted on the thread portion when the metallic container is filled with gas is offset by the residual compressive stress, so that the stress actually exerted on the thread portion can be alleviated significantly. Fatigue fracture originating from the thread portion can thus be suppressed.

Here, the tensile stress generated during use of the high pressure gas container spreads not only on the surface of the thread portion but also inside the material. Hence, the foregoing effect cannot be achieved if the residual compressive stress exists only in the surface layer of the thread portion. Accordingly, in the present disclosure, the maximum value of residual compressive stress at a position 0.4 mm in the depth direction from the thread bottom is 100 MPa or more.

Meanwhile, if the maximum value of residual compressive stress is excessively high, the member constituting the metallic container buckles and the metallic container deforms. To prevent such deformation of the metallic container, the maximum value of residual compressive stress is less than or equal to the tensile strength of the material of the metallic cylinder and less than or equal to the tensile strength of the material of the lid.

The maximum value of residual compressive stress is more preferably less than or equal to the yield stress of the material of the metallic cylinder and less than or equal to the yield stress of the material of the lid, from the viewpoint of more reliably preventing buckling of the thread portion.

Herein, the maximum value of residual compressive stress is the value in a state in which no internal pressure is applied to the metallic container. The maximum value of residual compressive stress may be obtained by elasto-plastic analysis by the finite element method (FEM). Alternatively, the maximum value of residual compressive stress may be obtained by measuring the residual stress in a cross section of each of the male thread portion and the female thread portion by X-ray stress measurement.

[Metallic Cylinder]

The material of the metallic cylinder is not limited, and may be any metal. The material is preferably low-alloy steel, from the viewpoint of cost reduction. It is particularly preferable to use, as the low-alloy steel, at least one of chromium molybdenum steel (JIS SCM steel), nickel chromium molybdenum steel (JIS SNCM steel), manganese chromium steel (JIS SMnC steel), manganese steel (JIS SMn steel), ASEM SA-723, and boron-added steel N28CB, N36CB, and N46CB. Of these, chromium molybdenum steel, SA-723 steel, or nickel chromium molybdenum steel, with which quench hardenability can be easily ensured, is more preferable from the viewpoint of balancing with the material strength. For example, chromium molybdenum steel (SCM435) contains C: 0.33 mass % to 0.38 mass %, Si: 0.15 mass % to 0.35 mass %, Mn: 0.60 mass % to 0.90 mass %, P: 0.030 mass % or less, S: 0.030 mass % or less, Cr: 0.90 mass % to 1.20 mass %, and Mo: 0.15 mass % to 0.30 mass %.

As the metallic cylinder, a metallic cylinder produced by any method may be used. For example, the container may be produced by hollowing out a steel material, or produced by working a steel pipe or tube. As the steel pipe or tube, any steel pipe or tube such as an electric resistance welded steel pipe or tube or a seamless steel pipe or tube may be used. In particular, a metallic cylinder composed of a seamless steel pipe or tube is preferable. A metallic cylinder composed of a seamless steel pipe or tube not only has excellent properties such as toughness as compared with a metallic cylinder produced by hollowing but also has no weld portion, and thus is very suitable as a high pressure gas container.

As mentioned above, the female thread portion for screwing the lid is provided on the inner peripheral surface of at least one end of the metallic cylinder. In other words, the metallic cylinder has an opening for attaching the lid at at least one end, and the female thread portion is provided on the inner peripheral surface of the opening. The female thread portion is preferably provided at both ends of the metallic cylinder.

The size of the opening is not limited. If the opening is excessively small, however, it is difficult to apply sufficient compressive residual stress to the thread portion by the below-described method. Accordingly, the ratio Di/Ds of the inner diameter Di of the metallic cylinder to the inner diameter Ds of the female thread portion in the metallic cylinder is preferably 3.5 or less, more preferably 2.0 or less, and further preferably 1.5 or less. Herein, the inner diameter Ds of the female thread portion is defined as the distance between the thread bottoms at opposite positions of the female thread portion formed on the inner peripheral surface of the metallic cylinder. The inner diameter Di of the metallic cylinder refers to the inner diameter of the metallic cylinder where the female thread portion is not formed, i.e. the inner diameter of the gas storage portion.

If Di/Ds is less than 0.8, the threads are excessively deep for the thickness of the metallic cylinder, so that the stress exerted on the thread bottom increases. Therefore, Di/Ds is preferably 0.8 or more and more preferably 0.9 or more, from the viewpoint of further reducing the stress exerted on the thread bottom.

[Carbon Fiber Reinforced Resin Layer]

A carbon fiber reinforced resin layer may be provided on the surface of the metallic container. By providing the carbon fiber reinforced resin layer, the pressure resistance and fatigue resistance of the container can be further improved.

Carbon fiber reinforced resin is a composite material obtained by impregnating carbon fiber as a reinforcing material with resin to improve the strength, and is called carbon-fiber-reinforced plastics (CFRP). As the carbon fiber, any carbon fiber such as PAN-based or pitch-based may be used, without being limited thereto. The volume content of the carbon fiber in the carbon fiber reinforced resin layer can be determined in accordance with Japanese Industrial Standard JIS K 7075 (1991). Usually, the volume content of the carbon fiber is preferably in the range of 50% to 80%.

The carbon fiber reinforced resin layer can cover the whole or part of the outer surface of the metallic container. For example, the high pressure gas container may have a structure (full-wrap) in which the whole outer surface of the metallic container is covered with the carbon fiber reinforced resin layer. From the viewpoint of cost reduction, however, the high pressure gas container preferably has a structure in which the carbon fiber reinforced resin layer is hoop-wrapped, i.e. a structure in which the carbon fiber is wound around the metallic container only in the circumferential direction.

In the case where the carbon fiber reinforced resin layer is provided on the outer surface of the metallic container, the outer peripheral surface of the metallic container is preferably subjected to treatment for prevention of electrolytic corrosion, such as coating by powder coating or winding of glass fiber reinforced resin (GFRP). As a result, even if cracking or the like occurs in the carbon fiber reinforced resin layer which is the surface layer and moisture accumulates at the interface between the liner layer and the carbon fiber reinforced resin layer, the metallic container can be prevented from rusting due to potential difference corrosion. For powder coating, thermoplastic powder paints based on vinyl chloride resin and the like and thermosetting powder paints based on polyester resin, acrylic resin, epoxy resin, etc. may be used. Given the heat generated when charging gas such as hydrogen, thermosetting powder paints are preferable.

[Lid]

The lid of the metallic container is not limited, and may be any lid having, on the outer peripheral surface, a male thread portion configured to screw into the female thread portion of the metallic cylinder. In other words, the high pressure container according to the present disclosure includes a screw-type lid attachable to at least one end of the metallic cylinder. The lid may be a single-piece structure or a structure composed of a plurality of members.

The lid preferably has a sealing member for sealing the high pressure gas in the container, on the outer peripheral surface. The sealing member is not limited, and may be any sealing member. An O-ring is preferably used as the sealing member. In the case where the lid includes an O-ring, the O-ring is preferably located on the container inner side relative to the male thread portion.

The material of the lid is not limited, but is preferably metal, and more preferably steel. As the steel, a steel material (low-alloy steel) having a tensile strength (TS) of 750 MPa or more is further preferable. The material of the lid may be the same as the foregoing material of the metallic cylinder. The material of the lid and the material of the metallic cylinder may be the same or different, but are preferably the same. In the case where the lid is composed of a plurality of members as in the examples illustrated in FIGS. 3 and 4, the materials of the members may be selected independently or each other, and may be the same or different.

The screw shape of the male thread portion of the lid is not limited, and may be, for example, a screw shape defined by JIS. The screw shape is preferably such a shape that reduces stress concentration. An example of the shape that reduces stress concentration is a screw with a large curvature radius at the tip of the thread bottom (e.g. a trapezoidal screw with a rounded tip).

Three embodiments will be given below to describe examples of the structure of the lid. The following description will be made with reference to schematic diagrams each illustrating a structure in which the lid is attached to the metallic cylinder, but the high pressure gas container according to the present disclosure is not limited to the state in which the lid is attached to the metallic cylinder.

Figure 2:
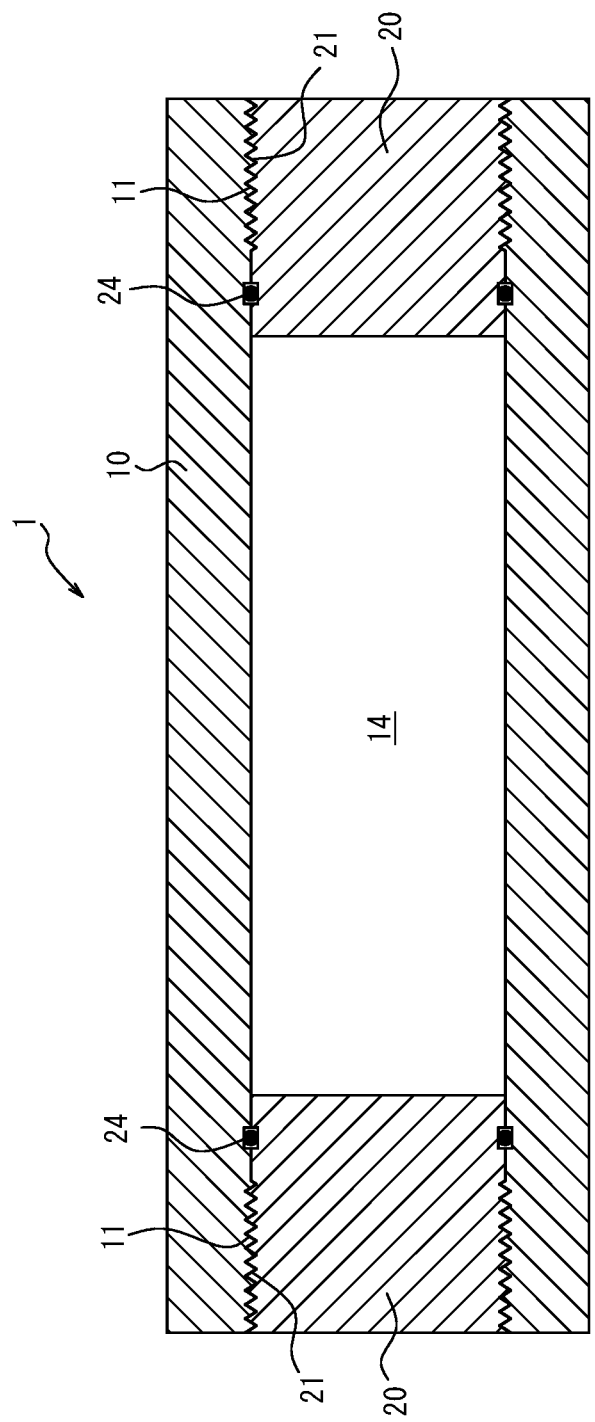
FIG. 2 is a schematic sectional diagram illustrating the structure of a high pressure gas container in one embodiment of the present disclosure.

FIG. 2 is a schematic diagram illustrating the structure of a high pressure gas container 1 in one embodiment of the present disclosure. A cross section along a plane passing through the central axis of the high pressure gas container 1 is illustrated in the drawing. The high pressure gas container 1 includes a metallic cylinder 10, and the internal space of the metallic cylinder forms a storage portion 14 for storing high pressure gas. A female thread portion 11 is provided on the inner peripheral surface of each of both ends of the metallic cylinder 10.

A solid columnar lid 20 is provided at each of both ends of the metallic cylinder 10. A male thread portion 21 configured to screw into the female thread portion of the metallic cylinder 10 is provided on the outer peripheral surface of the lid 20. A lid of such a single-piece structure has the advantage that it can be produced easily.

The lid 20 has an O-ring 24 as a sealing member on the outer peripheral surface. The male thread portion 21 is located on the container outer side relative to the O-ring 24 (i.e. on the side opposite to the storage portion 14).

Figure 3:
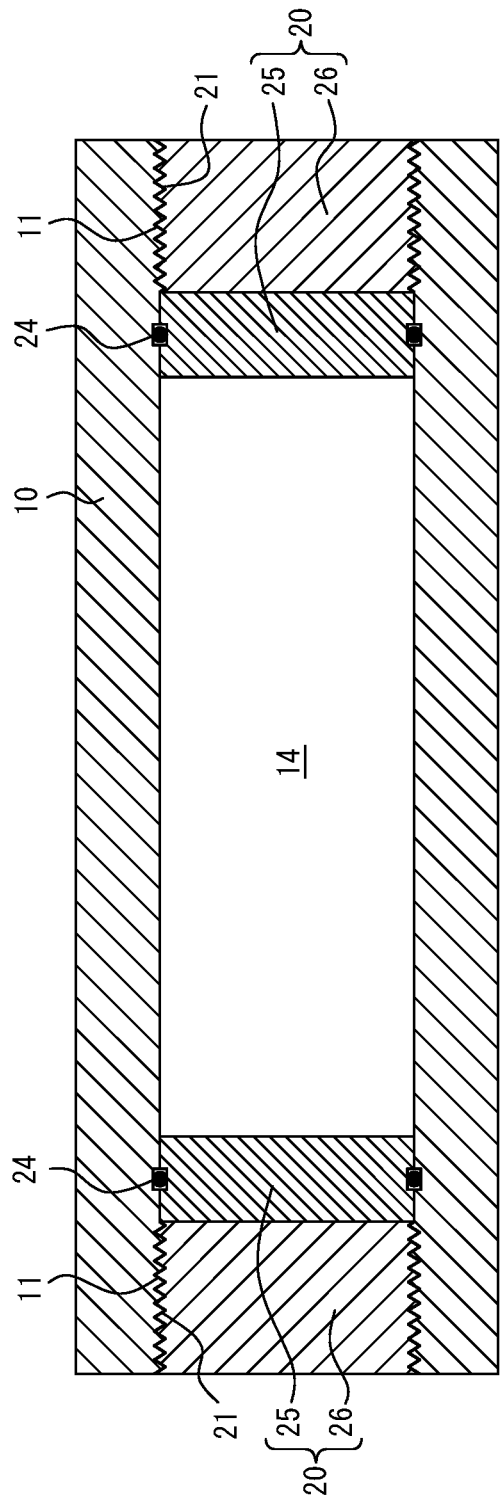
FIG. 3 is a schematic sectional diagram illustrating the structure of a high pressure gas container in another embodiment of the present disclosure.

FIG. 3 is a schematic sectional diagram illustrating the structure of a high pressure gas container 1 in another embodiment of the present disclosure. The description of the same parts as those in the embodiment illustrated in FIG. 2 is omitted here.

The lid 20 in this embodiment is composed of a head plate 25 and a screw nut 26. The head plate 25 is a substantially plate-like (disk-shaped) member for sealing the gas in the container, and has an O-ring 24 as a sealing member on its peripheral surface instead of having a thread portion. Of the two facing main surfaces of the head plate 25, one main surface is in contact with the storage portion 14 and the other main surface is in contact with the screw nut 26. The screw nut 26 is a solid columnar member, and has, on its outer peripheral surface, a male thread portion 21 configured to screw into the female thread portion of the metallic cylinder 10. By attaching the head plate and the screw nut 26 as illustrated in FIG. 3, the head plate 25 can be supported by the screw nut 26. A lid of such a separated structure has the advantage that, when the male thread portion of the screw nut is damaged, only the screw nut needs to be replaced and the head plate does not need to be replaced.

Figure 4:
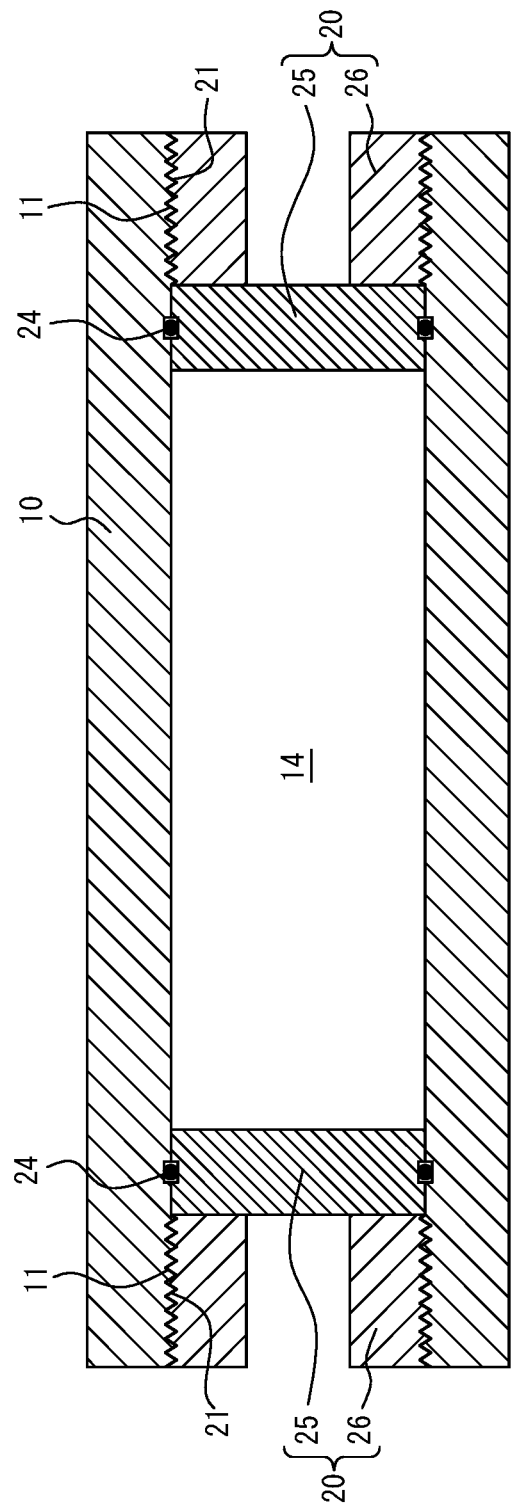
FIG. 4 is a schematic sectional diagram illustrating the structure of a high pressure gas container in another embodiment of the present disclosure.

FIG. 4 is a schematic sectional diagram illustrating the structure of a high pressure gas container 1 in another embodiment of the present disclosure. The description of the same parts as those in the embodiment illustrated in FIG. 3 is omitted here.

The lid 20 in this embodiment is composed of a head plate 25 and a screw nut 26. The head plate 25 is a substantially plate-like (disk-shaped) member for sealing the gas in the container, and has an O-ring 24 as a sealing member on its peripheral surface instead of having a thread portion. Of the two facing main surfaces of the head plate 25, one main surface is in contact with the storage portion 14 and the other main surface is in contact with the screw nut 26. The screw nut 26 is a hollow cylindrical member, and has, on its outer peripheral surface, a male thread portion 21 configured to screw into the female thread portion of the metallic cylinder 10. By attaching the head plate 25 and the screw nut 26 as illustrated in FIG. 4, the head plate 25 can be supported by the screw nut 26.

A lid of such a separated structure has the advantage that, when the male thread portion of the screw nut is damaged, only the screw nut needs to be replaced and the head plate does not need to be replaced, as in the embodiment illustrated in FIG. 4. Moreover, in this embodiment, since the screw nut 26 is hollow cylindrical, the weight of the lid can be considerably reduced, so that the weight of the high pressure gas container can be reduced. Furthermore, since it is easier to apply stress to the thread bottom of the male thread portion than in the case where the screw nut 26 is a solid columnar member, residual compressive stress can be applied to the thread bottom of the male thread portion without exerting excessive stress on the metallic cylinder.

The hollow cylindrical screw nut 26 can be produced by any method. For example, a steel material may be hollowed out to form a hollow cylinder, or a steel pipe or tube may be used. As the steel pipe or tube, any steel pipe or tube such as an electric resistance welded steel pipe or tube or a seamless steel pipe or tube may be used. A seamless steel pipe or tube is preferable. In particular, if both the metallic cylinder 10 and the screw nut 26 are composed of seamless steel pipes or tubes, a common process can be used in part of the production processes for the metallic cylinder and the screw nut, which is very preferable from the viewpoint of productivity.

In the case where the lid is composed of a plurality of members as mentioned above, the tensile strength of the member provided with the male thread portion from among the members constituting the lid is defined as the tensile strength of the material of the lid. Likewise, in the case where the lid is composed of a plurality of members, the yield stress of the member provided with the male thread portion from among the members constituting the lid is defined as the yield stress of the material of the lid. For example, in the case of the lids illustrated in FIGS. 3 and 4, the tensile strength and the yield stress of the material of the screw nut 26 are defined as the tensile strength and the yield stress of the material of the lid.

[Tightening of Lid]

As mentioned above, by applying predetermined residual compressive stress beforehand to the vicinity of the thread bottom, the stress exerted on the thread portion when the metallic container is filled with gas can be alleviated. When actually using the high pressure gas container according to the present disclosure, the stress reduction effect by the residual compressive stress varies depending on the force with which the lid is tightened.

In detail, tightening the lid on the high pressure gas container is usually performed by applying a certain torque. However, tightening the lid causes stress to be exerted on the thread portion. If the stress exceeds the residual compressive stress applied beforehand, the residual compressive stress is offset. Therefore, in the case of tightening the lid on the high pressure gas container according to the present disclosure so that the male thread portion of the lid will screw into the female thread portion of the metallic cylinder, it is preferable to adjust the tightening torque so that the compressive residual stress applied beforehand will remain. Specifically, it is preferable that the maximum value of residual compressive stress at a position of 0.4 mm in the depth direction from the plurality of thread bottoms of the female thread portion and male thread portion is more than 0.

Thus, in the high pressure gas container in one embodiment of the present disclosure, the male thread portion of the lid is screwed into the female thread portion of the metallic cylinder, and the maximum value of residual compressive stress at a position of 0.4 mm in the depth direction from the plurality of thread bottoms of the female thread portion and male thread portion is more than 0.

In other words, a high pressure gas container assembly in one embodiment of the present disclosure is a high pressure gas container assembly comprising a metallic container, wherein the metallic container includes: a metallic cylinder having a female thread portion on an inner peripheral surface of at least one end; and a lid having, on an outer peripheral surface, a male thread portion configured to screw into the female thread portion, the male thread portion of the lid is screwed into the female thread portion of the metallic cylinder, and a maximum value of residual compressive stress at a position of 0.4 mm in a depth direction from a plurality of thread bottoms of the female thread portion and male thread portion is more than 0, less than or equal to tensile strength of a material of the metallic cylinder, and less than or equal to tensile strength of a material of the lid.

To retain the compressive residual stress applied beforehand, lower tightening torque is more preferable. The lower limit of the tightening torque may therefore be 0. If the tightening torque is excessively low, the lid may become loose due to vibration or the like during transportation of the high pressure gas container. Accordingly, the lid is preferably tightened with a torque of 10 Nm or more, and more preferably tightened with a torque of 100 Nm or more. To prevent the lid from loosening and coming off, it is also preferable to attach a jig for preventing the lid from coming off to the high pressure gas container.

[Production Method]

A production method for a high pressure gas container in one embodiment of the present disclosure will be described below. As mentioned above, when internal pressure higher than the normal pressure of the high pressure gas container is applied to the high pressure gas container, excessive stress is generated and local plastic deformation occurs in the thread bottom. Since plastic deformation occurs only in one part and most of the other regions are elastic regions, compressive stress remains in the thread bottom after the internal pressure is removed. Hence, by applying high internal pressure to the high pressure gas container in the high pressure gas container production process, the predetermined residual compressive stress can be applied to the thread portion.

Embodiment 1

A production method for a metallic container in one embodiment of the present disclosure comprises an internal pressure application process of applying an internal pressure to a metallic container under at least one of the following conditions (A) and (B) and under both of the following conditions (C) and (D). With this production method, a high pressure gas container having the predetermined residual compressive stress can be produced.

(A) The thread bottom stress of the female thread portion is more than the yield stress of the material of the metallic cylinder.

(B) The thread bottom stress of the male thread portion is more than the yield stress of the material of the lid.

(C) The axial stress of the metallic cylinder is less than or equal to the tensile strength of the material of the metallic cylinder.

(D) The circumferential stress of the metallic cylinder is less than or equal to the tensile strength of the material of the metallic cylinder.

The reasons for limiting the foregoing conditions will be explained below.

Conditions (A) and (B)

To apply residual compressive stress to the vicinity of the thread bottom, it is necessary to cause plastic deformation in the thread bottom. Plastic deformation in the thread bottom can be caused by applying thread bottom stress exceeding the yield stress of the material. Therefore, in the present disclosure, the internal pressure is applied under at least one of the conditions (A) and (B) in the internal pressure application process. In the case where the condition (A) is satisfied, residual compressive stress can be applied to the female thread portion of the metallic cylinder. In the case where the condition (B) is satisfied, residual compressive stress can be applied to the male thread portion of the lid.

To apply the residual compressive stress more effectively, it is preferable that the thread bottom stress applied in the internal pressure application process is more than the tensile strength of the material. In other words, it is preferable to apply the internal pressure under at least one of the following conditions (A') and (B') in the internal pressure application process.

(A') The thread bottom stress of the female thread portion is more than the tensile strength of the material of the metallic cylinder.

(B') The thread bottom stress of the male thread portion is more than the tensile strength of the material of the lid.

No upper limit is placed on each of the thread bottom stress of the female thread portion and the thread bottom stress of the male thread portion in the internal pressure application process, and the thread bottom stress is adjusted so as to apply the desired residual compressive stress. From the viewpoint of effectively applying the residual compressive stress, the stress on the outer surface of the metallic cylinder (the outer peripheral surface of the cylinder) facing the female thread portion is preferably less than or equal to the yield stress of the material of the metallic cylinder in the internal pressure application process. By limiting the thread bottom stress to more than the yield stress and at the same time limiting the stress on the outer surface of the metallic cylinder to less than or equal to the yield stress, the residual compressive stress can be applied to the vicinity of the thread bottom more effectively than in the case where stress higher than the yield stress is applied to the metallic cylinder throughout its thickness.

For the same reason, in the case of using the lid composed of the head plate and the solid cylindrical screw nut as illustrated in FIG. 4, the stress on the inner surface of the screw nut (the inner peripheral surface of the cylindrical nut) facing the male thread portion is preferably less than or equal to the yield stress of the material of the screw nut in the internal pressure application process.

Conditions (B) and (C)

As mentioned above, an internal pressure needs to be applied to cause plastic deformation, in order to apply residual compressive stress. If the internal pressure is excessive, however, the metallic cylinder fractures. To prevent the fracture of the metallic cylinder, both the axial stress and the circumferential stress exerted on the metallic cylinder need to be less than or equal to the tensile strength of the material of the metallic cylinder. These conditions are specifically defined in the foregoing (B) and (C).

The axial stress and the circumferential stress exerted on the metallic cylinder can be calculated according to the following formulas (1) and (2) respectively:

$$\text{Axial stress} = (\text{pressure receiving area of lid} \times \text{internal pressure})/(\text{minimum cross-sectional area of metallic cylinder}) \quad (1).$$

$$\text{Circumferential stress} = (\text{inner diameter of metallic cylinder} \times \text{internal pressure})/(2 \times \text{thickness of metallic cylinder}) \quad (2).$$

Herein, the "pressure-receiving area of lid" is the area of the surface of the lid in contact with the storage portion. In the case where the head plate is used as illustrated in FIGS. 3 and 4, the "pressure-receiving area of lid" is the area of the head plate. The "cross-sectional area of metallic cylinder" is the cross-sectional area of the metal part in a cross section perpendicular to the axial direction of the metallic cylinder, and does not include the cross-sectional area of the internal space of the metallic cylinder. The cross-sectional area of the metallic cylinder may vary depending on the position in the longitudinal direction of the metallic cylinder, and the axial stress exerted on the metallic cylinder is maximum in the part where the cross-sectional area is minimum. Accordingly, the minimum cross-sectional area of the metallic cylinder is used in the formula (1). The axial stress and the circumferential stress calculated respectively using the formulas (1) and (2) are each average stress per cross-sectional area of the metallic cylinder. Meanwhile, the thread bottom stress which is local stress can be calculated by, for example, the finite element method as described later.

In the case where the carbon fiber reinforced resin layer is provided on the outer surface of the metallic container, the axial stress and the circumferential stress exerted on the metallic cylinder are lower than the values calculated according to the formulas (1) and (2) respectively. Hence, in the case where the carbon fiber reinforced resin layer is provided on the outer surface of the metallic container, the axial stress and the circumferential stress exerted on the metallic cylinder are evaluated by numerical analysis using the finite element method.

Thus, in the case where the carbon fiber reinforced resin layer is provided on the outer surface of the metallic container, higher internal pressure can be applied than in the case where the carbon fiber reinforced resin layer is not provided on the outer surface of the metallic container, so that residual compressive stress can be applied more effectively.

If at least one of the axial stress and the circumferential stress exerted on the metallic cylinder is more than the yield stress of the material of the metallic cylinder, there is a possibility that the metallic cylinder deforms plastically and the inner diameter of the metallic cylinder changes. Therefore, from the viewpoint of suppressing a decrease in sealability due to plastic deformation of the metallic cylinder, the axial stress and the circumferential stress exerted on the metallic cylinder are preferably less than or equal to the yield stress of the material of the metallic cylinder, and more preferably less than or equal to 90% of the yield stress. In other words, it is preferable to apply the internal pressure under both of the following conditions (C') and (D') and more preferable to apply the internal pressure under both of the following conditions (C") and (D") in the internal pressure application process.

(C') The axial stress of the metallic cylinder is less than or equal to the yield stress of the material of the metallic cylinder.

(D') The circumferential stress of the metallic cylinder is less than or equal to the yield stress of the material of the metallic cylinder.

(C") The axial stress of the metallic cylinder is less than or equal to 90% of the yield stress of the material of the metallic cylinder.

(D") The circumferential stress of the metallic cylinder is less than or equal to 90% of the yield stress of the material of the metallic cylinder.

To apply the internal pressure to the metallic container in the internal pressure application process, the metallic container is filled with any pressure medium. The pressure medium is not limited, and may be any medium. From the viewpoint of safety, an incompressible fluid such as water or oil is preferable. From the viewpoint of preventing corrosion of the metallic container, an incompressible fluid containing a corrosion inhibitor or an aqueous solution of alcohol such as ethylene glycol is preferable.

Embodiment 2

A production method for a metallic container in another embodiment of the present disclosure is a production method for a high pressure gas container, comprising: attaching a jig having a male thread portion on an outer peripheral surface to a metallic cylinder so that the male thread portion of the jig will screw into a female thread portion of the metallic cylinder; applying an internal pressure to the metallic container under the following conditions (A), (C), and (D):
  (A) thread bottom stress of the female thread portion is more than yield stress of a material of the metallic cylinder;
  (C) axial stress of the metallic cylinder is less than or equal to tensile strength of the material of the metallic cylinder; and
  (D) circumferential stress of the metallic cylinder is less than or equal to the tensile strength of the material of the metallic cylinder;
  removing the jig from the metallic container; and tightening the lid on the metallic container so that the male thread portion of the lid will screw into the female thread portion of the metallic cylinder, wherein in the tightening of the lid, tightening torque is adjusted so that a maximum value of residual compressive stress at a position of 0.4 mm in a depth direction from a plurality of thread bottoms of the female thread portion and the male thread portion will be more than 0.

With this production method, too, a high pressure gas container having the predetermined residual compressive stress can be produced. Each process will be described below.

[Jig Attachment Process]

First, a jig having a male thread portion on the outer peripheral surface is attached to a metallic cylinder so that the male thread portion of the jig will screw into the female thread portion of the metallic cylinder (jig attachment process). The jig may be any jig having the male thread portion configured to screw into the female thread portion of the metallic cylinder. As the jig, the same member used as the lid of the metallic container is preferably used. More preferably, the lid used as the jig is subsequently used again as the lid in the below-described lid tightening process.

The material of the jig is not limited, but is preferably metal, and more preferably steel. As the steel, a steel material (low-alloy steel) having a tensile strength (TS) of 750 MPa or more is further preferable. The material of the jig may be the same as the foregoing material of the metallic cylinder. The material of the jig and the material of the metallic cylinder may be the same or different, but are preferably the same.

[Internal Pressure Application Process]

After attaching the jig to the metallic cylinder, an internal pressure is applied to the metallic container under the following conditions (A), (C), and (D) (internal pressure application process). The reasons for limiting the conditions (A), (C), and (D) are as described in the foregoing Embodiment 1. The other points are the same as those in Embodiment 1 unless otherwise specified.

(A) The thread bottom stress of the female thread portion is more than the yield stress of the material of the metallic cylinder.

(C) The axial stress of the metallic cylinder is less than or equal to the tensile strength of the material of the metallic cylinder.

(D) The circumferential stress of the metallic cylinder is less than or equal to the tensile strength of the material of the metallic cylinder.

[Jig Removal Process]

After applying the internal pressure in the internal pressure application process, the jig is removed from the metallic container (jig removal process).

[Lid Tightening Process]

After this, the lid is tightened on the metallic cylinder so that the male thread portion of the lid will screw into the female thread portion of the metallic cylinder (lid tightening process). In the lid tightening process, the tightening torque is adjusted so that the maximum value of residual compressive stress at a position of 0.4 mm in the depth direction from the plurality of thread bottoms of the female thread portion and male thread portion will be more than 0.

As mentioned above, it is preferable to use the lid as the jig in the jig attachment process and again use, in the lid tightening process, the lid which was used in the jig attachment process. However, in the case where the lid includes a sealing member such as an O-ring, there is a possibility that, as a result of high internal pressure being exerted in the internal pressure application process, the sealing member is damaged and the sealability is impaired. Hence, it is preferable that, after removing the jig in the jig removal process, the sealing member of the lid is replaced before tightening the lid. Moreover, given that high internal pressure is exerted in the internal pressure application process, the diameter of the sealing member used in the internal pressure application process is preferably larger than the diameter of the sealing member used in the final lid tightening process.

EXAMPLES

The effects according to the present disclosure will be described below by way of examples. The present disclosure is not limited to the examples described below.

Example 1

The thread bottom stress was analyzed by elasto-plastic analysis by the finite element method (FEM) using container models. As the container models, the following two types of models were used: a Type 1 container composed of a metallic container made of low-alloy steel and having no carbon fiber reinforced resin layer; and a Type 2 container composed of a metallic container (liner) made of low-alloy steel same as the Type 1 container and a carbon fiber reinforced resin layer formed by winding CFRP on the surface of the metallic container so as to have a thickness of 5 mm. The metallic cylinder and the lid forming the metallic container were made of the same low-alloy steel. The tensile strength (TS) of the low-alloy steel was 821 MPa, and the yield stress (YP) of the low-alloy steel was 705 MPa. As the stress-strain curve of the low-alloy steel, the stress-strain curve of TS: 900 MPa class SNCM439 steel was used.

Regarding the dimensions of the metallic cylinder forming the metallic container, the length in the longitudinal direction was fixed at 4500 mm, the outer diameter was fixed at 404 mm, and the inner diameter and the thickness were as shown in Table 1. The lid had a structure including a disk-shaped head plate and a hollow cylindrical screw nut, as illustrated in FIG. 4. The thickness of the head plate was 75 mm, and the thickness of the screw nut was 37 mm. Herein, the thickness of the screw nut is the thickness from the apex of the thread portion provided on the outer peripheral surface to the inner surface. The screw shape was a JIS trapezoidal screw with a pitch of 12 mm, a thread depth of 12 mm, and a thread shoulder curvature radius of 2.2 mm. FEM analysis was performed with the following conditions:

Software: ABAQUS Ver. 6.12-4 (Dassault Systemes).
Calculation model: axisymmetric model.
Mesh division: 50 μm in stress concentration part.
Boundary condition: gas pressure applied to the inner surface of the metallic cylinder and the gas storage side of the head plate.
Constraint condition: metallic cylinder: node on Y symmetry plane, Y direction displacement constraint.
Head plate, screw nut: no positive node displacement fixation.
Contact condition: contact friction coefficient μ=0.05.

(Internal Pressure Application Process)

The thread bottom stress when the load internal pressure shown in Table 1 was applied to the metallic container was obtained by FEM. The maximum value of the thread bottom stress in the female thread portion and the maximum value of the thread bottom stress in the male thread portion are shown in Table 1. The maximum value of the thread bottom stress refers to the maximum value of the stress throughout the thickness from the thread bottom to the surface on the side opposite to the thread bottom. In this example, the maximum value of the thread bottom stress of the male thread portion in the internal pressure application process was lower than the maximum value of the thread bottom stress of the female thread portion in all cases shown in Table 1. Accordingly, only the maximum value of the thread bottom stress of the female thread portion is shown in Table 1.

The axial stress and the circumferential stress of the metallic cylinder when the load internal pressure was applied are also shown in Table 1. In the case where the metallic container was the Type 1 container, the axial stress and the circumferential stress were calculated according to the following formulas (1) and (2):

Axial stress=(pressure receiving area of lid×internal pressure)/(minimum cross-sectional area of metallic cylinder)  (1).

Circumferential stress=(inner diameter of metallic cylinder×internal pressure)/(2×thickness of metallic cylinder)  (2).

In the case where the metallic container was the Type 2 container, the axial stress and the circumferential stress were obtained by FEM analysis.

(Residual Compressive Stress)

Next, the residual compressive stress at a position 0.4 mm in the depth direction from the thread bottoms in a state in which the internal pressure was removed was obtained by FEM analysis. The maximum value of residual compressive stress in the male thread portion, the maximum value of residual compressive stress in the female thread portion, and the maximum value of residual compressive stress in the male and female thread portions are shown in Table 2.

Next, to evaluate the performance of each metallic container, the thread bottom stress when applying the internal pressure again and the thread portion fracture life were obtained.

(Thread Bottom Stress when Applying Internal Pressure)

Assuming the conditions when actually using the metallic container as a high pressure gas container, the maximum value of the thread bottom stress when applying an internal pressure of 82 MPa to the metallic container was obtained by FEM analysis. The results are shown in Table 2.

(Thread Portion Fracture Life)

From the stress obtained by FEM analysis, the fracture life of the thread portion in the pressure cycle test was evaluated. The fracture life was evaluated according to the "Crack Growth Analysis Method for Various Sites" (KHKS 0220 (2010) Annex IX) stipulated by the High Pressure Gas Safety Institute of Japan. The pressure application conditions were as follows: minimum pressure: 2 MPa, maximum pressure: 82 MPa, and temperature: room temperature.

As can be understood from the results shown in Table 2, by applying internal pressure under appropriate conditions, compressive residual stress satisfying the conditions according to the present disclosure was able to be introduced into the thread bottom. In each metallic container in which the maximum value of residual compressive stress at a position of 0.4 mm in the depth direction from the thread bottoms satisfied the conditions according to the present disclosure, the thread bottom stress when the internal pressure was applied was reduced, and consequently excellent fatigue life was achieved.

TABLE 1

| | | Metallic container | | | | | | | | |
|---|---|---|---|---|---|---|---|---|---|---|
| | | Metallic cylinder | | | | | Internal pressure application conditions | | | |
| No. | Container type | Thickness (mm) | Outer diameter (mm) | Inner diameter (mm) | Minimum thickness of female thread portion (mm) | Minimum cross-sectional area (mm$^2$) | Lid Pressure receiving area (mm$^2$) | Applied internal pressure (MPa) | Maximum value of thread bottom stress of female thread portion (MPa) | Axial stress (MPa) | Circumferential stress (MPa) |
| 1 | Type1 | 30 | 404 | 344 | 18 | 21828 | 92941 | 111 | 1092 | 471 | 635 |
| 2 | Type1 | 35 | 404 | 334 | 23 | 27530 | 87616 | 133 | 1080 | 422 | 633 |
| 3 | Type1 | 40 | 404 | 324 | 28 | 33075 | 82448 | 157 | 1108 | 390 | 634 |
| 4 | Type1 | 45 | 404 | 314 | 33 | 38463 | 77437 | 182 | 1080 | 366 | 634 |

TABLE 1-continued

| | | Metallic container | | | | | | | | |
|---|---|---|---|---|---|---|---|---|---|---|
| | | Metallic cylinder | | | | | | Internal pressure application conditions | | |
| No. | Container type | Thickness (mm) | Outer diameter (mm) | Inner diameter (mm) | Minimum thickness of female thread portion (mm) | Minimum cross-sectional area (mm$^2$) | Lid Pressure receiving area (mm$^2$) | Applied internal pressure (MPa) | Maximum value of thread bottom stress of female thread portion (MPa) | Axial stress (MPa) | Circumferential stress (MPa) |
| 5 | Type1 | 45 | 404 | 314 | 33 | 38463 | 77437 | 50 | 365 | 101 | 174 |
| 6 | Type1 | 50 | 404 | 304 | 38 | 43693 | 72583 | 2 | 23 | 3 | 6 |
| 7 | Type1 | 50 | 404 | 304 | 38 | 43693 | 72583 | 25 | 281 | 42 | 76 |
| 8 | Type1 | 50 | 404 | 304 | 38 | 43693 | 72583 | 50 | 563 | 83 | 152 |
| 9 | Type1 | 50 | 404 | 304 | 38 | 43693 | 72583 | 60 | 675 | 100 | 182 |
| 10 | Type1 | 50 | 404 | 304 | 38 | 43693 | 72583 | 63 | 690 | 105 | 192 |
| 11 | Type1 | 50 | 404 | 304 | 38 | 43693 | 72583 | 70 | 788 | 116 | 213 |
| 12 | Type1 | 50 | 404 | 304 | 38 | 43693 | 72583 | 209 | 1100 | 347 | 635 |
| 13 | Type2 | 55 | 404 | 294 | 43 | 48767 | 67887 | 300 | 1180 | 418 | 650 |
| 14 | Type2 | 55 | 404 | 294 | 43 | 48767 | 67887 | 380 | 1280 | 529 | 710 |
| 15 | Type1 | 55 | 404 | 294 | 43 | 48767 | 67887 | 237 | 1080 | 330 | 634 |
| 16 | Type1 | 55 | 404 | 294 | 43 | 48767 | 67887 | 50 | 309 | 70 | 134 |
| 17 | Type1 | 60 | 404 | 284 | 48 | 53684 | 63347 | 268 | 1092 | 316 | 635 |
| 18 | Type1 | 60 | 404 | 284 | 48 | 53684 | 63347 | 50 | 292 | 59 | 118 |
| 19 | Type1 | 65 | 404 | 274 | 53 | 58443 | 58965 | 301 | 1102 | 303 | 634 |
| 20 | Type1 | 70 | 404 | 264 | 58 | 63045 | 54739 | 337 | 1108 | 292 | 635 |
| 21 | Type1 | 50 | 450 | 350 | 38 | 49185 | 96211 | 180 | 1132 | 352 | 630 |
| 22 | Type1 | 50 | 425 | 325 | 38 | 46200 | 82958 | 190 | 1050 | 341 | 618 |
| 23 | Type1 | 50 | 350 | 250 | 38 | 37247 | 49087 | 240 | 1020 | 316 | 600 |
| 24 | Type1 | 50 | 250 | 150 | 38 | 25309 | 17671 | 350 | 850 | 244 | 525 |
| 25 | Type1 | 80 | 350 | 190 | 68 | 60243 | 28353 | 480 | 756 | 226 | 570 |

TABLE 2

| | Residual compressive stress at position of 0.4 mm in depth direction from thread bottom | | | Test results | | |
|---|---|---|---|---|---|---|
| No. | Female thread portion (MPa) | Male thread portion (MPa) | Maximum value (MPa) | Maximum value of thread bottom stress when applying internal pressure of 82 MPa (MPa) | Thread portion fracture life (times) | Remarks |
| 1 | 435 | 12 | 435 | 698 | 256778 | Example |
| 2 | 401 | 15 | 401 | 630 | 313321 | Example |
| 3 | 346 | 13 | 346 | 572 | 296674 | Example |
| 4 | 331 | 10 | 331 | 514 | 324351 | Example |
| 5 | 0 | 0 | 0 | 803 | 126690 | Comparative Example |
| 6 | 0 | 0 | 0 | 793 | 130456 | Comparative Example |
| 7 | 0 | 0 | 0 | 793 | 130069 | Comparative Example |
| 8 | 0 | 0 | 0 | 793 | 138892 | Comparative Example |
| 9 | 15 | 1 | 15 | 793 | 131232 | Comparative Example |
| 10 | 53 | 1 | 53 | 700 | 150789 | Comparative Example |
| 11 | 105 | 2 | 105 | 682 | 266045 | Example |
| 12 | 345 | 12 | 345 | 456 | 623345 | Example |
| 13 | 468 | 120 | 468 | 380 | 789654 | Example |
| 14 | 780 | 190 | 780 | 310 | 1132014 | Example |
| 15 | 332 | 110 | 332 | 419 | 753212 | Example |
| 16 | 0 | 0 | 0 | 781 | 152496 | Comparative Example |
| 17 | 112 | 15 | 112 | 391 | 546672 | Example |
| 18 | 0 | 0 | 0 | 757 | 242496 | Comparative Example |
| 19 | 265 | 50 | 265 | 370 | 599012 | Example |
| 20 | 280 | 18 | 280 | 351 | 755431 | Example |
| 21 | 320 | 18 | 320 | 502 | 312355 | Example |
| 22 | 340 | 20 | 340 | 525 | 304456 | Example |
| 23 | 115 | 16 | 115 | 695 | 243318 | Example |
| 24 | 230 | 32 | 230 | 325 | 1099540 | Example |
| 25 | 215 | 25 | 215 | 280 | 1344351 | Example |

Example 2

How the conditions of tightening the lid on the metallic cylinder influence the fatigue life was evaluated by FEM analysis. Specifically, for each of the containers of No. 6, 11, and 13 in Example 1, the lid was removed after the internal pressure application process, and then the lid was tightened again under the conditions shown in Table 3. Then, the thread bottom stress when applying the internal pressure again and the thread portion fracture life were obtained according to the same procedure as in Example 1. The results are shown in Table 3.

As can be understood from the results shown in Table 3, the thread portion fracture life was further improved by tightening the lid so that the maximum value of residual compressive stress at a position of 0.4 mm in the depth direction from the thread bottom would be more than 0.

TABLE 3

| | | Before tightening | | After tightening | Test results | |
|---|---|---|---|---|---|---|
| No | Container No. | Maximum value of residual compressive stress at position of 0.4 mm in depth direction from thread bottom (MPa) | Tightening torque | Maximum value of residual compressive stress at position of 0.4 mm in depth direction from thread bottom (MPa) | Maximum value of thread bottom stress when applying internal pressure of 82 MPa (MPa) | Thread portion fracture life (times) |
| 26 | 6 | 0 | Not present | 0 | 790 | 130,456 |
| 27 | 6 | 0 | Present | −15 | 808 | 122,334 |
| 28 | 6 | 0 | Present | −365 | 428 | 17,561 |
| 29 | 11 | 105 | Not present | 105 | 680 | 266,045 |
| 30 | 13 | 468 | Not present | 468 | 353 | 623,345 |
| 31 | 13 | | Present | 197 | 599 | 332,821 |
| 32 | 13 | | Present | 111 | 685 | 249,653 |
| 33 | 13 | | Present | −5 | 798 | 143,565 |
| 34 | 13 | | Present | −320 | 1113 | 56,451 |
| 35 | 13 | | Present | −442 | 1235 | 12,359 |

REFERENCE SIGNS LIST

1 high pressure gas container
10 metallic cylinder
11 female thread portion
12 thread groove
13 thread bottom of female thread portion
14 storage portion
20 lid
21 male thread portion
22 thread ridge
23 thread bottom of male thread portion
24 O-ring
25 head plate
26 screw nut
P position of 0.4 mm in depth direction from thread bottom

The invention claimed is:

1. A high pressure gas container comprising a metallic container,
wherein the metallic container includes: a metallic cylinder having a female thread portion on an inner peripheral surface of at least one end; and a lid having, on an outer peripheral surface, a male thread portion configured to screw into the female thread portion, and
a maximum value of residual compressive stress at a position of 0.4 mm in a depth direction from a plurality of thread bottoms of the female thread portion and the male thread portion is 100 MPa or more, less than or equal to tensile strength of a material of the metallic cylinder, and less than or equal to tensile strength of a material of the lid.

2. The high pressure gas container according to claim 1, wherein the maximum value of residual compressive stress is less than or equal to yield stress of the material of the metallic cylinder, and less than or equal to yield stress of the material of the lid.

3. The high pressure gas container according to claim 1, wherein the male thread portion of the lid is screwed into the female thread portion of the metallic cylinder, and
the maximum value of residual compressive stress at a position of 0.4 mm in the depth direction from the plurality of thread bottoms of the female thread portion and the male thread portion is more than 0.

4. A production method for a high pressure gas container including a metallic container that includes: a metallic cylinder having a female thread portion on an inner peripheral surface of at least one end; and a lid having, on an outer peripheral surface, a male thread portion configured to screw into the female thread portion, the production method comprising
applying an internal pressure to the metallic container under at least one of the following conditions (A) and (B) and under both of the following conditions (C) and (D):
(A) thread bottom stress of the female thread portion is more than yield stress of a material of the metallic cylinder;
(B) thread bottom stress of the male thread portion is more than yield stress of a material of the lid;
(C) axial stress of the metallic cylinder is less than or equal to tensile strength of the material of the metallic cylinder; and
(D) circumferential stress of the metallic cylinder is less than or equal to the tensile strength of the material of the metallic cylinder.

5. A production method for a high pressure gas container including a metallic container that includes: a metallic cylinder having a female thread portion on an inner peripheral surface of at least one end; and a lid having, on an outer peripheral surface, a male thread portion configured to screw into the female thread portion, the production method comprising:
attaching a jig having a male thread portion on an outer peripheral surface to the metallic cylinder so that the male thread portion of the jig is screwed into the female thread portion of the metallic cylinder;

applying an internal pressure to the metallic container under the following conditions (A), (C), and (D):

(A) thread bottom stress of the female thread portion is more than yield stress of a material of the metallic cylinder;

(C) axial stress of the metallic cylinder is less than or equal to tensile strength of the material of the metallic cylinder; and (D) circumferential stress of the metallic cylinder is less than or equal to the tensile strength of the material of the metallic cylinder;

removing the jig from the metallic container; and tightening the lid on the metallic cylinder so that the male thread portion of the lid is screwed into the female thread portion of the metallic cylinder, wherein in the tightening of the lid, tightening torque is adjusted so that a maximum value of residual compressive stress at a position of 0.4 mm in a depth direction from a plurality of thread bottoms of the female thread portion and the male thread portion will be more than 0.

6. The high pressure gas container according to claim 2, wherein the male thread portion of the lid is screwed into the female thread portion of the metallic cylinder, and the maximum value of residual compressive stress at a position of 0.4 mm in the depth direction from the plurality of thread bottoms of the female thread portion and the male thread portion is more than 0.

* * * * *